May 2, 1939.   W. B. RANNEY   2,156,353
CABLE CONVEYER
Filed Oct. 11, 1937
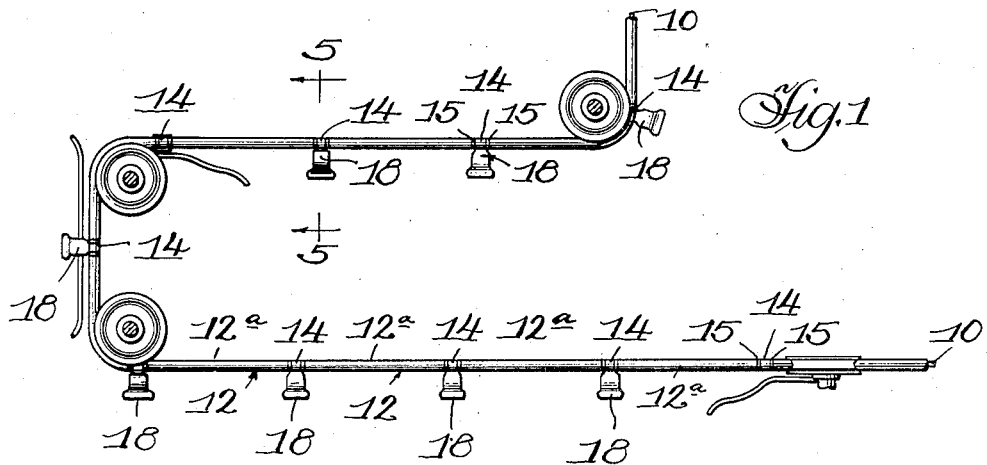
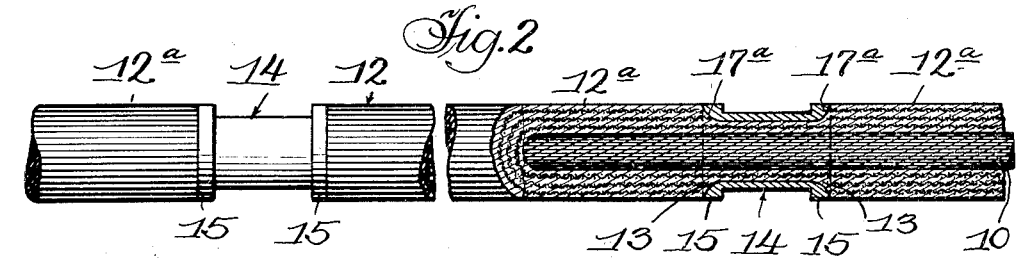
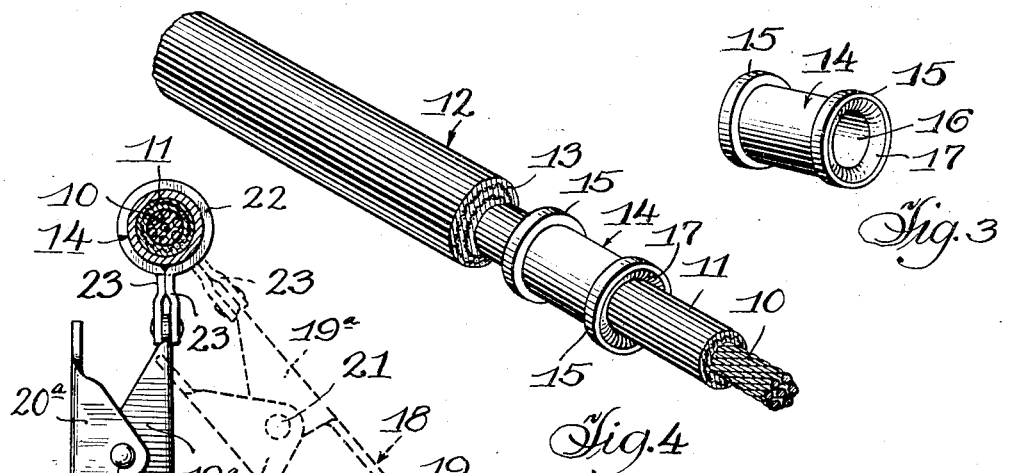
Inventor,
Willet B. Ranney,
Offield Nehlhope Scott & Poole
Attys.
Witness:

Patented May 2, 1939

2,156,353

UNITED STATES PATENT OFFICE 2,156,353

CABLE CONVEYER

Willet B. Ranney, Chicago, Ill., assignor to Wm. Wrigley Jr. Company, Chicago, Ill., a corporation of Delaware Application October 11, 1937, Serial No. 168,348

5 Claims. (Cl. 198—130)

This invention relates to a cable conveyer of the kind equipped with spaced conveying devices to be carried by supporting and guiding pulleys for the cable, and consists of the matters hereinafter described and more particularly pointed out in the appended claims.

Woven wire steel cables are generally employed, as for carrying conveying devices of various kinds. Such cables, however, because of the conveying devices attached to them, or because of their own inherent weakness to resist strain in passing about pulleys, frequently changing direction of travel at an angle, soon wear with resultant fraying and splintering of the wires of the cable which reduces the efficiency and the life of the cable.

The object of the invention is to provide an improved cable conveyer of the kind constructed to prevent wear, fraying and splintering, with resultant increased efficiency and length of life. The cable is of particular advantage in use with automatic apparatus requiring a strong but highly flexible cable adapted for travel at sharp angles about the supporting pulleys, with accurately spaced bearing sleeves for the support of conveying devices capable of free swinging movement about the axis of the cable as a center, to be moved in timed relation with the automatic mechanism with which it is included.

The advantages of the invention will appear more fully as I proceed with my specification.

In the drawing:

Fig. 1 is a view in side elevation showing a part of a cable conveyer made in accordance with the invention, trained about supporting pulleys and carrying conveying devices or clips.

Fig. 2 is a longitudinal sectional, side elevation of the cable.

Fig. 3 is a perspective view of one of the conveying devices.

Fig. 4 is a perspective view of the cable with one of the conveying devices in position ready to be brought to its final place on the cable.

Fig. 5 is a view on an enlarged scale representing a section through Fig. 1 in a plane indicated by the line 5—5 thereof.

Referring now to that embodiment of the invention shown in the drawing: 10 indicates a flexible wire-woven steel cable of familiar form. This provides the core for the improved cable. About this core is provided throughout the length of the cable with a sheathing of fabric and rubber 11. This is vulcanized throughout its length in any familiar manner.

14 indicates a sleeve designed for the support of the conveying device. This sleeve may be in the form of a spool as shown in Fig. 3, or otherwise adapted for engagement with a conveying device 18. It has end flanges 15, 15 and a central bore 16 which is adapted to be slipped endwise upon the vulcanized sheathing 11. The ends of the bore 16 are flared outwardly towards the ends of the flanges 15 as shown at 17.

The predetermined spaced location of the ends of the several supporting sleeves 14 to be carried by the cable are then marked or in any way indicated on the vulcanized sheathing 11. One or more of the sleeves 14 are then assembled endwise upon the vulcanized sheathing 11 of said cable and are fixed or held in the required spaced relation. Short lengths 12 of a sheathing of fabric and rubber are then wrapped about the vulcanized sheathing 11 between the sleeves 14 in such manner as to extend at their ends into the flared ends 17 of the sleeves 14. The sheathing lengths 12 are then vulcanized in the process of which they are fixed to the sheathing 11, and their ends are forced into the flared ends 17 of the flanges 15, providing shoulders 13 for rigid engagement therewith.

The number of lengths 12 of the outer sheathing and the number of supporting sleeves 14 included in each operation of the vulcanizing device depends upon the length of said vulcanizing device. But the lengths 12 of the outer sheathing are preferably divided before vulcanizing as indicated at 12$^a$, so that each step of vulcanizing may force the shoulder 13 into the associated flared end 17 of a sleeve 14. The division of the lengths 12 is such that the vulcanizing device will overlap the points 12$^a$ and vulcanize the two divisions together at their abutting ends to join them as one. The process is continued until the cable is equipped with the required number of spaced supporting sleeves 14.

The cable is now ready for the application of the particular devices to be carried thereby. As illustrated, it is designed for conveying boxes to be packed with merchandise, such as chewing gum or the like. In Fig. 5 is shown a clip 18 to grasp a box lid. This is of familiar construction comprising the arms 19, 20 having flanges 19$^a$, 20$^a$ hinged tong fashion at 21. An eye 22 is bent upon and thus applied to the spool 14 between its end flanges 15, and its ends 23, 23 riveted together and to the top end of the arm 19. The hanger 18 is free to swing upon the spool 14.

I claim as my invention:

1. A conveyer cable comprising a flexible wire-woven core, a sheathing of fabric and rubber vulcanized on said core, a plurality of sleeves closely engaging said sheathing and located in longitudinally spaced relation thereon, and a plurality of lengths of sheathing of fabric and rubber interposed between said sleeves and severally vulcanized on said first named sheathing in close abutting relation with the ends of said sleeves.

2. A conveyer cable comprising a flexible wire-woven core, a sheathing of fabric and rubber vulcanized on said core, a plurality of sleeves closely engaging said sheathing and located in longitudinally spaced relation thereon, said sleeves having end flanges, and a plurality of lengths of sheathing of fabric and rubber interposed between said sleeves and severally vulcanized on said first named sheathing in close abutting relation with the end flanges of said sleeves.

3. A cable conveyer comprising a flexible wire-woven core, a sheathing of fabric and rubber vulcanized on said core, a plurality of sleeves closely engaging said sheathing and located in longitudinally spaced relation thereon, a plurality of lengths of sheathing of fabric and rubber interposed between said sleeves and severally vulcanized on said first named sheathing in close abutting relation with the ends of said sleeves, and conveying devices rotatably suspended from said sleeves.

4. A cable conveyer comprising a flexible wire-woven core, a sheathing of fabric and rubber vulcanized on said core, a plurality of sleeves closely engaging said sheathing and located in longitudinally spaced relation thereon, a plurality of lengths of sheathing of fabric and rubber interposed between said sleeves and severally vulcanized on said first named sheathing in close abutting relation with the ends of said sleeves, conveying devices mounted on said sleeves, and means for rotatably mounting said conveying devices on said sleeves.

5. A cable conveyer comprising a flexible wire-woven core, a sheathing of fabric and rubber vulcanized on said core, a plurality of sleeves closely engaging said sheathing and located in longitudinally spaced relation thereon, said sleeves having end flanges, a plurality of lengths of sheathing of fabric and rubber interposed between said sleeves and severally vulcanized on said first named sheathing in close abutting relation with the end of said sleeves, conveying devices mounted on said sleeves, and means for rotatably mounting said conveying devices on said sleeves.

WILLET B. RANNEY.